United States Patent
Tomasic et al.

(10) Patent No.: US 10,784,549 B2
(45) Date of Patent: *Sep. 22, 2020

(54) LINEAR-TO-CIRCULAR POLARIZERS USING CASCADED SHEET IMPEDANCES AND CASCADED WAVEPLATES

(71) Applicant: Government of the United States, as represented by the Secretary of the Air Force, Wright-Patterson AFB, OH (US)

(72) Inventors: Boris Tomasic, Harvard, MA (US); Carl R. Pfeiffer, Beavercreek, OH (US); Thomas P. Steffen, Xenia, OH (US)

(73) Assignee: The United States of America, as represented by the Secretary of the Air Force, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,602

(22) Filed: Nov. 13, 2018

(65) Prior Publication Data

US 2019/0173144 A1    Jun. 6, 2019

Related U.S. Application Data

(62) Division of application No. 16/181,624, filed on Nov. 6, 2018.

(Continued)

(51) Int. Cl.
*H01P 1/17*    (2006.01)
*H01Q 15/24*    (2006.01)
(Continued)

(52) U.S. Cl.
CPC ............ *H01P 1/17* (2013.01); *H01P 1/171* (2013.01); *H01P 1/172* (2013.01); *H01P 1/173* (2013.01); *H01Q 3/2676* (2013.01); *H01Q 3/40* (2013.01); *H01Q 5/335* (2015.01); *H01Q 15/04* (2013.01); *H01Q 15/24* (2013.01); *H01Q 15/244* (2013.01);
(Continued)

(58) Field of Classification Search
CPC .. H01P 1/17; H01P 1/173; H01P 1/172; H01P 1/171; H01P 11/00; H01Q 21/0031; H01Q 15/04; H01Q 5/335; H01Q 21/064; H01Q 15/248; H01Q 15/244; H01Q 3/40;
(Continued)

(56) References Cited

U.S. PATENT DOCUMENTS

2019/0173143 A1*  6/2019  Tomasic .................. H01P 1/172
2019/0173192 A1*  6/2019  Tomasic .................. H01P 1/173
2019/0173193 A1*  6/2019  Tomasic .............. H01Q 21/064

* cited by examiner

*Primary Examiner* — Robert J Pascal
*Assistant Examiner* — Kimberly E Glenn
(74) *Attorney, Agent, or Firm* — AFMCLO/JAZ

(57) ABSTRACT

An ultra-wideband linear-to-circular polarizer is disclosed. In accordance with embodiments of the invention, the polarizer includes a plurality of cascaded waveplates having biaxial permittivity or cascaded anisotropic sheet impedances. Each waveplate/sheet has a principal axis rotated at different angles relative to an adjacent waveplate/sheet about a z-axis of a 3-dimensional x, y, z coordinate system. Each waveplate is composed of a unit cell of an artificial anisotropic dielectric. Each sheet impedance is composed of an anisotropic metallic pattern. The polarizer further includes impedance matching layers disposed adjacent the cascaded waveplates/sheets.

8 Claims, 14 Drawing Sheets

Related U.S. Application Data

(60) Provisional application No. 62/594,804, filed on Dec. 5, 2017.

(51) Int. Cl.
  *H01Q 3/26* (2006.01)
  *H01Q 3/40* (2006.01)
  *H01Q 21/06* (2006.01)
  *H01Q 5/335* (2015.01)
  *H01Q 15/04* (2006.01)
  *H01Q 21/00* (2006.01)
  *G02B 27/28* (2006.01)
  *H01P 11/00* (2006.01)

(52) U.S. Cl.
  CPC ....... *H01Q 15/246* (2013.01); *H01Q 21/0031* (2013.01); *H01Q 21/064* (2013.01); *G02B 27/286* (2013.01); *H01P 11/00* (2013.01)

(58) Field of Classification Search
  CPC .......... H01Q 3/2676; H01Q 3/15; H01Q 3/24; G02B 27/286
  USPC ........................................................ 33/21 A
  See application file for complete search history.

LINEAR-TO-CIRCULAR POLARIZERS USING CASCADED SHEET IMPEDANCES AND CASCADED WAVEPLATES

CROSS-REFERENCE TO RELATED APPLICATION(S)

The present application is a continuation of U.S. application Ser. No. 16/181,624 filed Nov. 6, 2018, which claims the benefit of U.S. Provisional Application No. 62/594,804, filed Dec. 5, 2017, the contents of which are hereby incorporated by reference.

STATEMENT OF GOVERNMENT INTEREST

The invention described herein may be manufactured, used, and licensed by or for the Government of the United States for all governmental purposes without the payment of any royalty.

BACKGROUND

Linear-to-circular polarizers convert an incident, linearly polarized plane wave into a transmitted, circularly polarized wave. Linear-to-circular polarizers are commonly utilized from microwave to optical frequencies for a myriad of applications. Many of these applications also demand wide operating bandwidths and wide angles of incidence. However, conventional linear-to-circular polarizers only work perfectly at a single frequency making them inherently narrowband.

At THz frequencies and higher, wideband linear-to-circular polarizers are typically realized by cascading multiple birefringent waveplates with rotated principal axes. Polarizers utilizing cascaded waveplates can realize multiple octaves of bandwidth. At these higher frequencies, the geometry can afford to be many wavelengths in thickness while still maintaining a low profile since the wavelength is short. A disadvantage inherent in these designs is that they do not typically work well at wide angles of incidence since the optical thickness of the plate is a function of the angle of incidence.

At microwave frequencies, the most common linear-to-circular polarizers utilize cascaded patterned metallic sheets (i.e., sheet impedances) with subwavelength overall thicknesses. The bandwidth of microwave linear-to-circular polarizers are typically less than 40%. In some examples, the bandwidth has been increased up to an octave using meanderline metallic patterns printed on dielectric substrates. However, these meanderline polarizers do not typically work well at wide angles of incidence when their bandwidth is large.

Conventional waveplates composed of uniaxial dielectrics (i.e., $\varepsilon_{xx} = \varepsilon_{zz} \neq \varepsilon_{yy}$) only operate at a single frequency. It has been known since the 1950s that the bandwidth can be significantly extended by cascading waveplates with different thicknesses and relative orientations to develop so-called achromatic waveplates. These waveplates are commercially available at optical frequencies with bandwidths of over 4:1. While this design approach has been scaled down from optical frequencies to THz and mm-waves, as the wavelength is increased further, the required thickness of naturally occurring crystals becomes prohibitive due to the notable, weight, size, and loss.

In view of the above, it would be advantageous to provide a linear-to-circular polarizer that provides improved wideband performance.

SUMMARY OF THE DISCLOSURE

There is provided a linear-to-circular polarizer that includes a plurality of cascaded waveplates having biaxial permittivity. Each waveplate has a principal axis rotated at different angles relative to an adjacent waveplate about a z-axis of a 3-dimensional x, y, z coordinate system. Impedance matching layers are disposed adjacent the cascaded waveplates.

In accordance with a further embodiment of the invention, a first assembly of impedance matching layers is disposed adjacent a first waveplate of the cascaded waveplates, and a second assembly of impedance matching layers is disposed adjacent a second waveplate of the cascaded waveplates. In an example embodiment, the plurality of cascaded waveplates includes four waveplate assemblies, where each assembly is rotated at a different angle relative to an adjacent waveplate assembly.

In accordance with another embodiment of the invention, a first waveplate is rotated at a first angle relative about the z-axis, a second waveplate is rotated at a second angle about the z-axis, a third waveplate is rotated at a third angle about the z-axis, and a fourth waveplate is rotated at a fourth angle about the z-axis, where the selection of the first, second and third angles is based on operating wavelengths of the polarizer.

In accordance with yet another embodiment of the invention, each waveplate has a respective length with respect to the z-axis different from a length of an adjacent waveplate.

In accordance with still a further embodiment of the invention, the impedance matching layers have a biaxial permittivity.

In accordance with yet another embodiment of the invention, the impedance matching layers include a first assembly of impedance matching layers and a second assembly of impedance matching layers, where each of the first and second assemblies of impedance matching layers include a first section having a first permittivity $\in_1$, a second section having a second permittivity $\in_2$ greater than the first permittivity, and a third section having a third permittivity $\in_3$ greater than the second permittivity.

In accordance with a further embodiment of the invention, where in each of the first and second assemblies of impedance matching layers, the first section has a first thickness, the second section has a second thickness, and the third section has a third thickness less than the first thickness and greater than the second thickness.

In accordance with still another embodiment of the invention, each assembly of impedance matching layers includes a plurality of different substrates.

In accordance with yet another embodiment of the invention, each waveplate includes a unit cell of an artificial anisotropic dielectric.

In accordance with still a further embodiment, each unit cell includes a substrate patterned with a copper patch.

In accordance with another embodiment, there is provided a linear-to-circular polarizer that includes a plurality of cascaded anisotropic sheets. Each sheet has a principal axis rotated at different angles relative to an adjacent sheet about a z-axis of a 3-dimensional x, y, z coordinate system. Impedance matching layers, as described above, are disposed adjacent the cascaded sheets.

In accordance with yet another embodiment, the cascaded sheets include anisotropic metallic patterns.

In accordance with still another embodiment, the anisotropic metallic patterns have meanderline and metallic patch geometries.

In accordance with yet another embodiment, a three dimensional (3D) printed dielectric grating is embedded between the impedance matching layers.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 4A is normal incidence, FIG. 4B is 45 degrees from normal, and FIG. 4C is 60 degrees from normal;

FIG. 10A is normal incidence, FIG. 10B is 45 degrees from normal, and FIG. 10C is 60 degrees from normal;

DETAILED DESCRIPTION

Figure 1A:
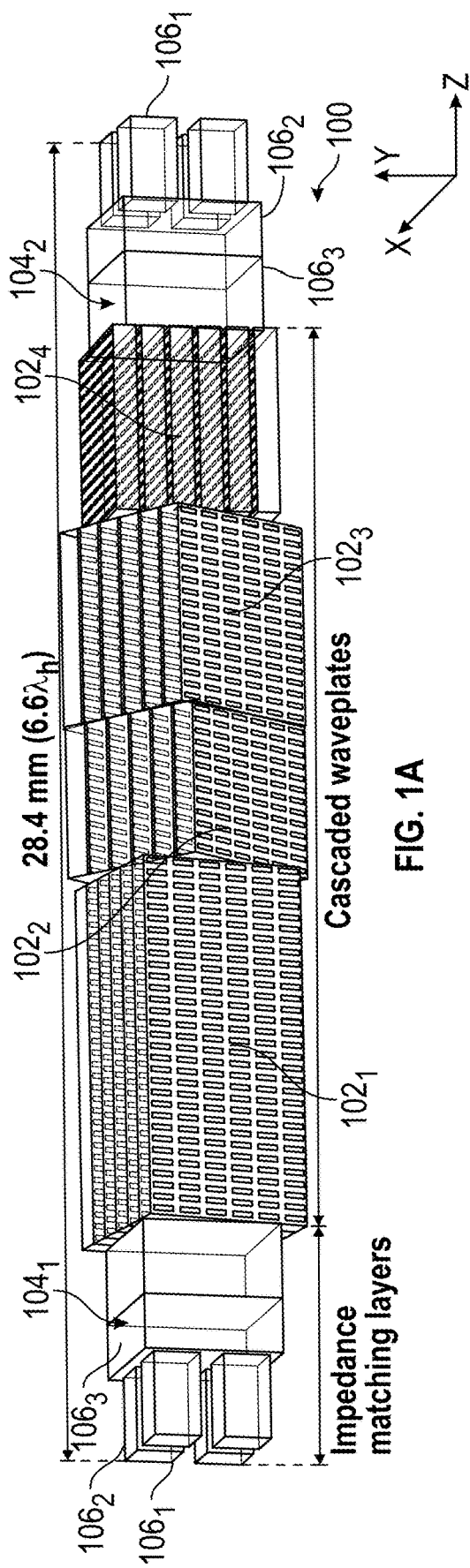
FIGS. 1A and 1B are high-level schematic diagrams of an ultra-wideband linear-to-circular polarizer in accordance with an embodiment of the invention.

Specific embodiments of the invention will now be described in detail with reference to the accompanying figures. While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

All documents mentioned herein are hereby incorporated by reference in their entirety. References to items in the singular should be understood to include items in the plural, and vice versa, unless explicitly stated otherwise or clear from the text.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

There is provided a linear-to-circular polarizer that includes a plurality of cascaded waveplates having biaxial permittivity. Each waveplate has a principal axis rotated at different angles relative to an adjacent waveplate about a z-axis of a 3-dimensional x, y, z coordinate system. Impedance matching layers are disposed adjacent the cascaded waveplates.

In accordance with a further embodiment of the invention, a first assembly of impedance matching layers is disposed adjacent a first waveplate of the cascaded waveplates, and a second assembly of impedance matching layers is disposed adjacent a second waveplate of the cascaded waveplates. In an example embodiment, the plurality of cascaded waveplates includes four waveplate assemblies, where each assembly is rotated at a different angle relative to an adjacent waveplate assembly.

In accordance with another embodiment of the invention, a first waveplate is rotated at a first angle relative about the z-axis, a second waveplate is rotated at a second angle about the z-axis, a third waveplate is rotated at a third angle about the z-axis, and a fourth waveplate is rotated at a fourth angle about the z-axis, where the selection of the first, second and third angles is based on operating wavelengths of the polarizer.

In accordance with yet another embodiment of the invention, each waveplate has a respective length with respect to the z-axis different from a length of an adjacent waveplate.

In accordance with still a further embodiment of the invention, the impedance matching layers have a biaxial permittivity.

In accordance with yet another embodiment of the invention, the impedance matching layers include a first assembly of impedance matching layers and a second assembly of impedance matching layers, where each of the first and second assemblies of impedance matching layers include a first section having a first permittivity $\in_1$, a second section having a second permittivity $\in_2$ greater than the first permittivity, and a third section having a third permittivity $\in_3$ greater than the second permittivity.

In accordance with a further embodiment of the invention, where in each of the first and second assemblies of impedance matching layers, the first section has a first thickness, the second section has a second thickness, and the third section has a third thickness less than the first thickness and greater than the second thickness.

In accordance with still another embodiment of the invention, each assembly of impedance matching layers includes a plurality of different substrates.

In accordance with yet another embodiment of the invention, each waveplate includes a unit cell of an artificial anisotropic dielectric.

In accordance with still a further embodiment, each unit cell includes a substrate patterned with a copper patch.

In accordance with another embodiment, there is provided a linear-to-circular polarizer that includes a plurality of cascaded anisotropic sheets. Each sheet has a principal axis rotated at different angles relative to an adjacent sheet about a z-axis of a 3-dimensional x, y, z coordinate system. Impedance matching layers, as described above, are disposed adjacent the cascaded sheets.

In accordance with yet another embodiment, the cascaded sheets include anisotropic metallic patterns.

In accordance with still another embodiment, the anisotropic metallic patterns have meanderline and metallic patch geometries.

In particular, for an arbitrary structure illuminated with a normally incident plane wave, the linearly polarized transmission matrix ($T^{LIN}$) of the structure relates the incident electric field $E_i$ to the transmitted electric field $E_t$:

$$\begin{pmatrix} E_t^x \\ E_t^y \end{pmatrix} = T^{LIN} \begin{pmatrix} E_i^x \\ E_i^y \end{pmatrix} = e^{-j\delta} \begin{pmatrix} T_{xx} & T_{xy} \\ T_{yx} & T_{yy} \end{pmatrix} \begin{pmatrix} E_i^x \\ E_i^y \end{pmatrix},$$

where $\delta$ represents a constant phase shift. An ideal linear-to-circular polarizer converts an incident x-polarization to a transmitted right-hand circular polarization. This may be represented by $T_{xx}=1/\sqrt{2}$ and $T_{yx}=-j/\sqrt{2}$. It is convenient to characterize the performance of a linear-to-circular polarizer by considering the linear-to-circular transmission matrix ($T^{CP}$), which may be defined as:

$$\begin{pmatrix} E_t^R \\ E_t^L \end{pmatrix} = T^{CP} \begin{pmatrix} E_i^x \\ E_i^y \end{pmatrix} = \begin{pmatrix} T_{Rx} & T_{Ry} \\ T_{Lx} & T_{Ly} \end{pmatrix} \begin{pmatrix} E_i^x \\ E_i^y \end{pmatrix},$$

where R and L denote transmission into right- and left-handed circular polarizations, respectively. Ideally, $T_{Rx}=1$ and $T_{Lx}=0$. The polarization purity of the transmitted wave is often expressed in terms of the axial ratio (AR), which can be related to the linear-to-circular transmission matrix by:

$$AR = \frac{|T_{Rx}/T_{Lx}|+1}{|T_{Rx}/T_{Lx}|-1}.$$

A y-polarized wave is not considered in this description.

The polarizers described herein are reported at different angles of incidence, where the E and H planes are defined relative to the plane of the incident wave. In this regard, the E-plane corresponds to the $\phi=0°$ plane and the H-plane is the $\phi=90°$ plane. It should also be noted that the term $T_{Rx}$ characterizes the transmission of both obliquely incident waves and normally incident waves.

Figure 1B:
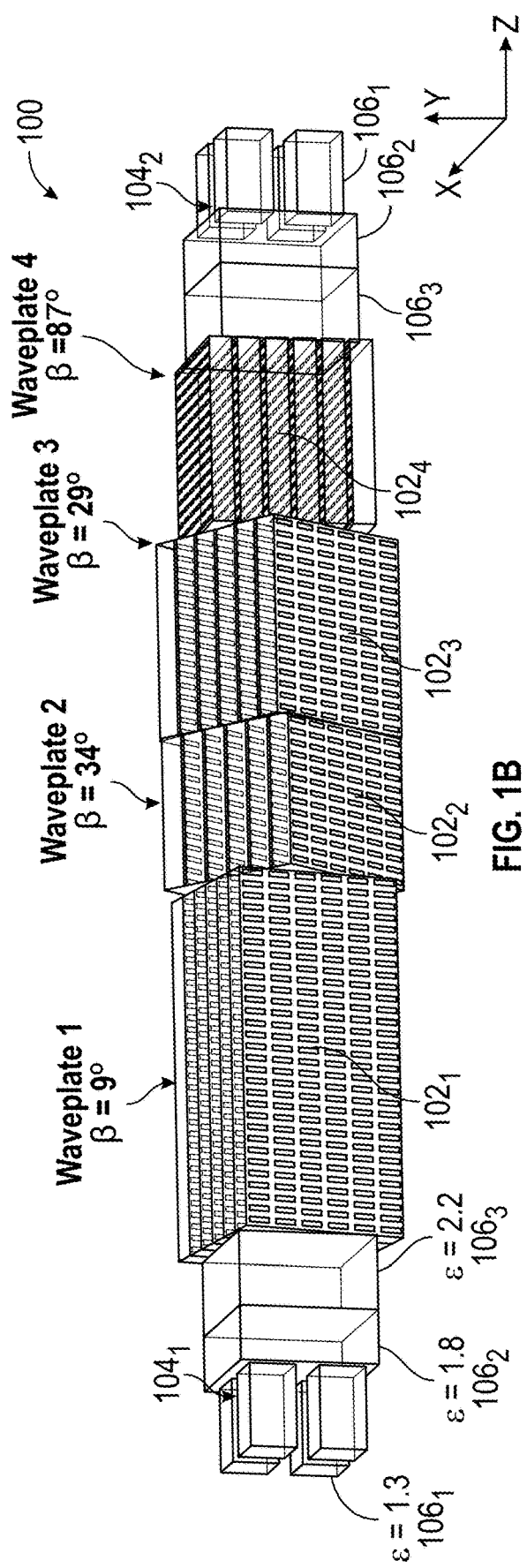

FIGS. 1A and 1B are high-level schematic diagrams of a linear-to-circular polarizer 100 in accordance with an embodiment of the invention. The linear-to-circular polarizer 100 includes a plurality of cascaded waveplates $102_1 \ldots 102_N$ (where "N" is any suitable number) (depicted with four waveplates in the example embodiment) disposed relative to a 3-dimensional x, y and z coordinate system. The cascaded waveplates $102_1 \ldots 102_N$ exhibit biaxial permittivity. Each waveplate has a principal axis rotated at different angles relative to an adjacent waveplate about the z-axis, and each waveplate can be provided with a respective length with respect to the z-axis different from a length of an adjacent waveplate. The polarizer 100 further includes impedance matching layers $104_1$, $104_2$ that are disposed adjacent, or substantially adjacent, the cascaded waveplates $102_1 \ldots 102_N$. In the example shown, the overall length of the assembly is approximately 28.4 mm corresponding to wavelengths of approximately $6.6\lambda_h$. This is merely illustrative, as the configuration is dependent upon the desired operating conditions as explained further below.

For a single waveplate polarizer, ignoring reflection losses and absorption, the transmission matrix of the waveplate may be represented by:

$$T_{wp}(\beta, d\Delta n) = R(\beta)^{-1} \begin{pmatrix} 1 & 0 \\ 0 & e^{-jk_0 d\Delta n} \end{pmatrix} R(\beta)$$

Figure 2:
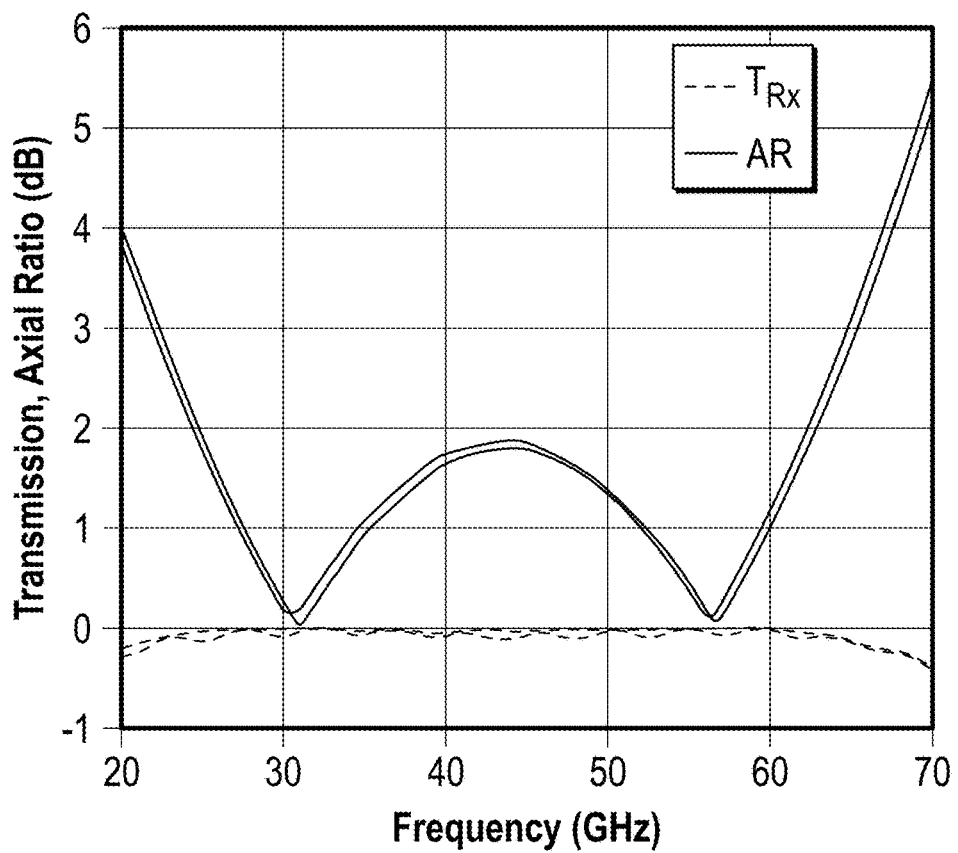
FIG. 2 is a graphical representation of the simulated response when the permittivities of a pair of waveplates are increased and the polarizer is illuminated at an angle of incidence of 45° in the E- and H-planes.

Because performance is sensitive to the angle of incidence, in accordance with some embodiments of the permittivity is increased to bend the wave towards the normal direction as it propagates through the structure in accordance with Snell's law. The angle of incidence is further increased by controlling the permittivity of the waveplates $102_1 \ldots 102_N$ in the x, y and z directions to reduce the index contrast between the two eigenpolarizations at oblique angles, which compensates for the increased optical thickness attributable to the impedance matching layers $104_1$, $104_2$. For example, if the permittivity in the z-direction is increased such that $$\varepsilon_1 = \begin{pmatrix} 1.02 & 0.05 & 0 \\ 0.05 & 1.16 & 0 \\ 0 & 0 & 1.08 \end{pmatrix}, \varepsilon_2 = \begin{pmatrix} 1.08 & 0.02 & 0 \\ 0.02 & 1.01 & 0 \\ 0 & 0 & 1.04 \end{pmatrix},$$

the transmission coefficient and axial ratio at 45° scan in the E and H planes as shown in graphical representation of FIG. 2. The response at oblique angles is analogous to a broadside case when the z-directed permittivity is properly chosen. The z-directed permittivity may be near the geometric mean of the u and v directed permittivities (i.e., the transverse permittivities along the principal axes) for the polarizer to be operable at wide scan angles.

Referring further to FIGS. 1A and 1B, each dielectric matching assembly of impedance matching layers $104_1$, $104_2$ impedance matches the artificial dielectrics to free space. Each dielectric assembly $104_1$, $104_2$ includes a first section $106_1$ having a first permittivity $\in_1$, a second section $106_2$ having a second permittivity $\in_2$ greater than the first permittivity, and a third section $106_3$ having a third permittivity $\in_3$ greater than the second permittivity. These sections may be referred to as "matching layers." The thickness and orientation of the different sections can be optimized using a genetic algorithm as will be appreciated by those skilled in the art. An exemplary expedient was implemented in MATLAB®, where for simplicity, the anisotropic dielectric slabs all have the same permittivity. In total there are 14 degrees of freedom that need to be optimized: thickness and permittivity of the 3 matching layers (6 unknowns), and thickness and orientation of the 4 anisotropic dielectrics (8 unknowns).

The cost function that is minimized is given by, $$= \sum_\omega \left[ (1 + |T_{Lx}(\omega, 0°, 0°)| - |T_{Rx}(\omega, 0°, 0°)|)^5 + \sum_\phi \left( \frac{(1 + |T_{Lx}(\omega, 60°, \phi)| - |T_{Rx}(\omega, 60°, \phi)|)^5}{10} \right) \right]$$

where $T_{Rx}(\omega, \theta, \phi)$ and $T_{Lx}(\omega, \theta, \phi)$ are the transmission coefficients when excited with a plane wave at a given frequency and angle of incidence.

This cost function maximizes $T_{Rx}$ and minimizes $T_{Lx}$ which minimizes insertion loss and axial ratio over the desired bandwidth and angles of incidence. The transmission coefficients are calculated at 21 frequency points between approximately 15 GHz and 70 GHz, and at angles of incidence $\phi=0°$, 60° and $\phi=-45°$, 0°, 45°, 60°. A larger weight is assigned to the transmission coefficients at normal incidence. The summed elements within the cost function $(1+|T_{Lx}|-|T_{Rx}|)$ are raised to the 5th power, which helps optimize for the worst-case scenario. It should be emphasized that the cost function can be evaluated analytically (i.e. full wave simulations are not required), which leads to relatively quick convergence. The optimization process takes on the order of 30 minutes to complete with a 24 core CPU running at 2.5 GHz.

Once the optimal material permittivities and thicknesses are determined, each layer is physically implemented. The impedance matching layers are physically realized by stacking together different substrates. With reference again to FIGS. 1A and 1B, the effective permittivities of the impedance matching layers are approximately 1.3, 1.8, and 2.2, with thicknesses equal to approximately 1.8 mm, 1.2 mm, and 1.6 mm, respectively. A broadband impedance match between free space and the cascaded waveplates is realized by gradually transitioning the permittivity. The permittivity of the outermost dielectric is reduced from approximately 1.8 to 1.3, by milling trenches in the substrate.

Figure 3:
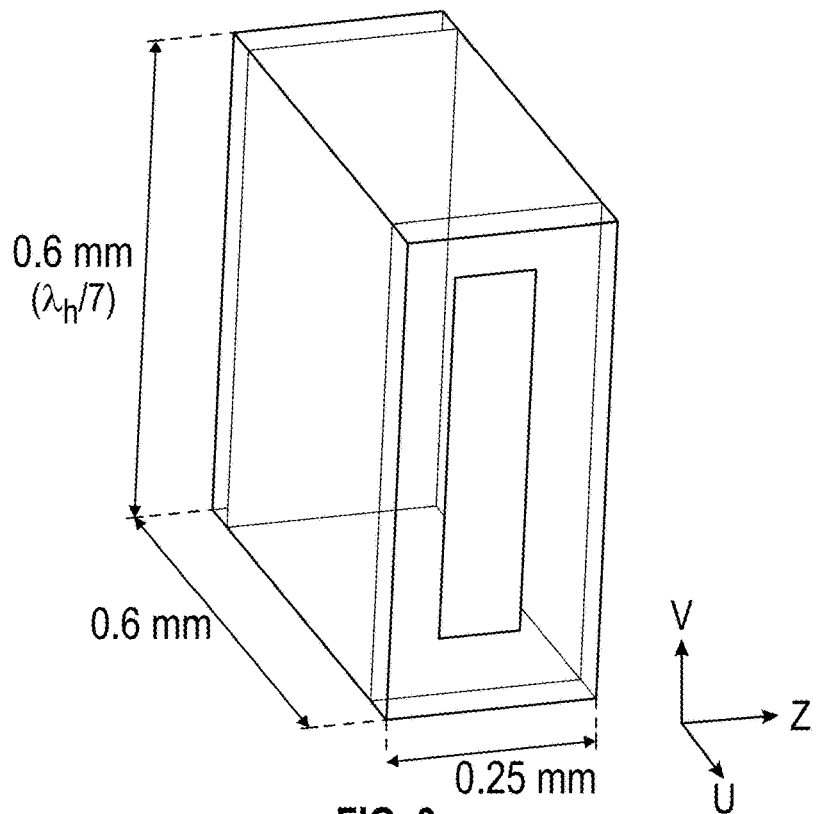
FIG. 3 is an isometric schematic of a unit cell of the cascaded, anisotropic waveplates in accordance with an embodiment of the invention.

A unit cell of the cascaded, anisotropic waveplates is shown in FIG. 3. It is designed using standard dielectric mixing formulas to realize the optimized anisotropic permittivity. The principal axes of the unit cell are oriented along the u, v, and z directions. Each cell consists of approximately 0.5 mm thickness Rogers 4003 substrate ($\varepsilon=3.55$) patterned with a copper patch that is approximately 0.1 mm×0.45 mm in size. The copper rectangle primarily increases the permittivity in the v direction, while minimally affecting the permittivity in the u and z directions. The small unit cell size reduces the effects of both temporal and spatial dispersion. The effective permittivity tensor of the unit cell was extracted by illuminating a 10-unit cell thick slab with normally incident plane waves propagating in the z and u directions, $$\begin{pmatrix} \varepsilon_{uu} & \varepsilon_{uv} & \varepsilon_{uz} \\ \varepsilon_{vu} & \varepsilon_{vv} & \varepsilon_{vz} \\ \varepsilon_{zu} & \varepsilon_{zv} & \varepsilon_{zz} \end{pmatrix} = \begin{pmatrix} 2.45 & 0 & 0 \\ 0 & 4.1 & 0 \\ 0 & 0 & 3.2 \end{pmatrix}$$

The orientation of the different layers are $\beta=9°$, $\beta=34°$, $\beta=29°$, and $\beta=87°$, for the first through fourth layers, respectively. The thickness (length) of the respective layers is approximately $t_1=7.75$ mm, $t_2=3.25$ mm, $t_3=4.25$ mm, and $t_4=4.00$ mm.

It will be understood by those skilled in the art that by increasing the anisotropy of the waveplate, the thickness can be reduced. In addition, this increases robustness to fabrication tolerances since the performance of a waveplate is proportional to the difference in the indices of refraction along the principal directions (i.e., $\underline{\varepsilon_{vv}} - \sqrt{\varepsilon_{uu}}$). For example, a single waveplate illuminated at normal incidence with $\varepsilon_{uu}=3.2$ and $\varepsilon_{vv}=3.5$ converts an incident linear polarization to circular polarization. If the permittivity of $\varepsilon_{vv}=3.5$ is reduced by approximately 5% due to manufacturing tolerances, the axial ratio of the transmitted field will increase from approximately 0 dB to 7.5 dB. However, if the designed permittivity contrast is increased such that $\varepsilon_{uu}=2$ and $\varepsilon_{vv}=3.5$, then a 5% decrease in $\varepsilon_{vv}$ only increases the axial ratio to 1 dB. At the same time, the permittivity contrast should not be increased more than approximately 15% since this makes it more difficult to impedance match the waveplates to free space using isotropic dielectrics.

The cascaded waveplates typically cannot be simulated as a single unit cell in a periodic lattice since the principal axes of the anisotropic layers are all different. Therefore, the simulated S-parameters of the polarizer are typically calculated by cascading the S-parameters of the individual waveplates. This technique assumes the field at the boundary between two different waveplates is accurately represented by the fundamental Floquet modes, which are propagating plane waves with TE and TM polarizations. In other words, the simulation neglects evanescent coupling between the different waveplates, which is expected to contribute only minor influences on the polarizer's response. Note that the circuit solver in the HFSS® modeling tool provides a convenient method of cascading the S-parameters of the individual waveplates.

Figure 4A:
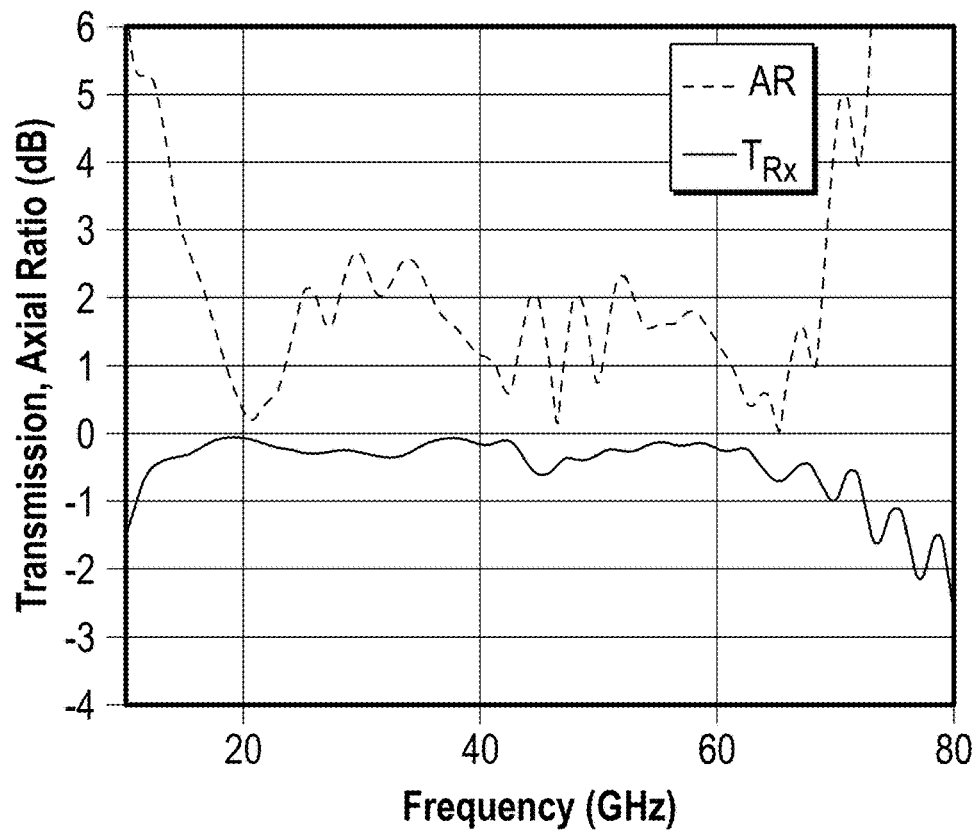
FIGS. 4A, 4B and 4C, are depictions of the simulated transmission coefficient and axial ratio for a polarizer in accordance with an embodiment of the invention when illuminated with an x-polarized plane wave for different angles of incidence, where
Figure 4B:
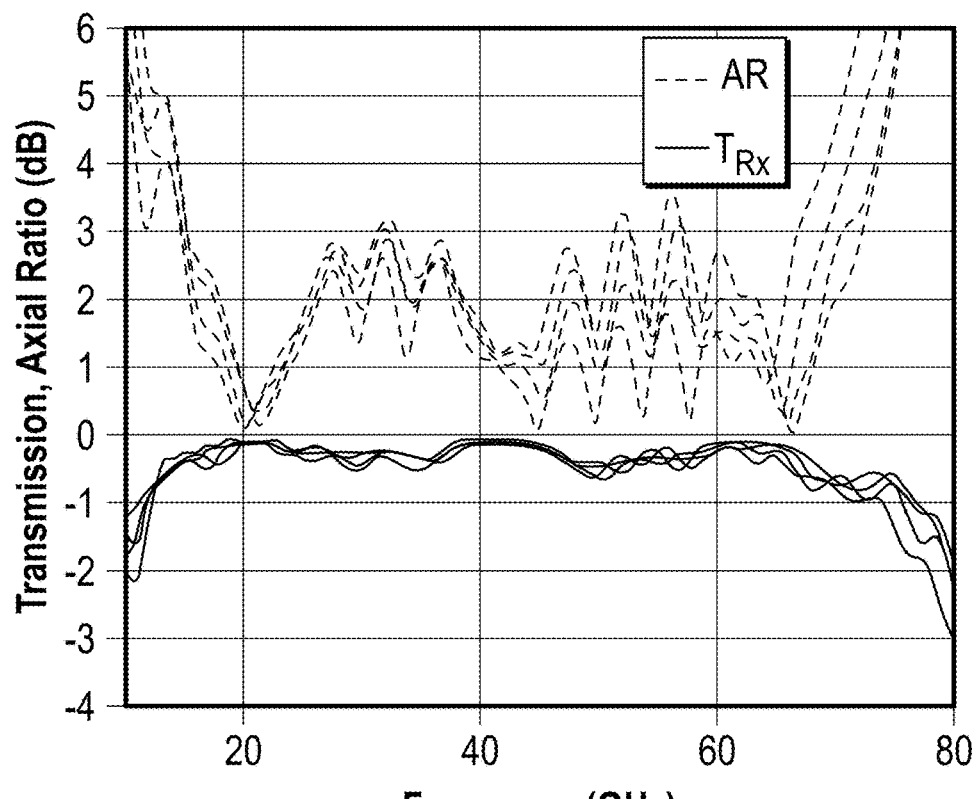
Figure 4C:
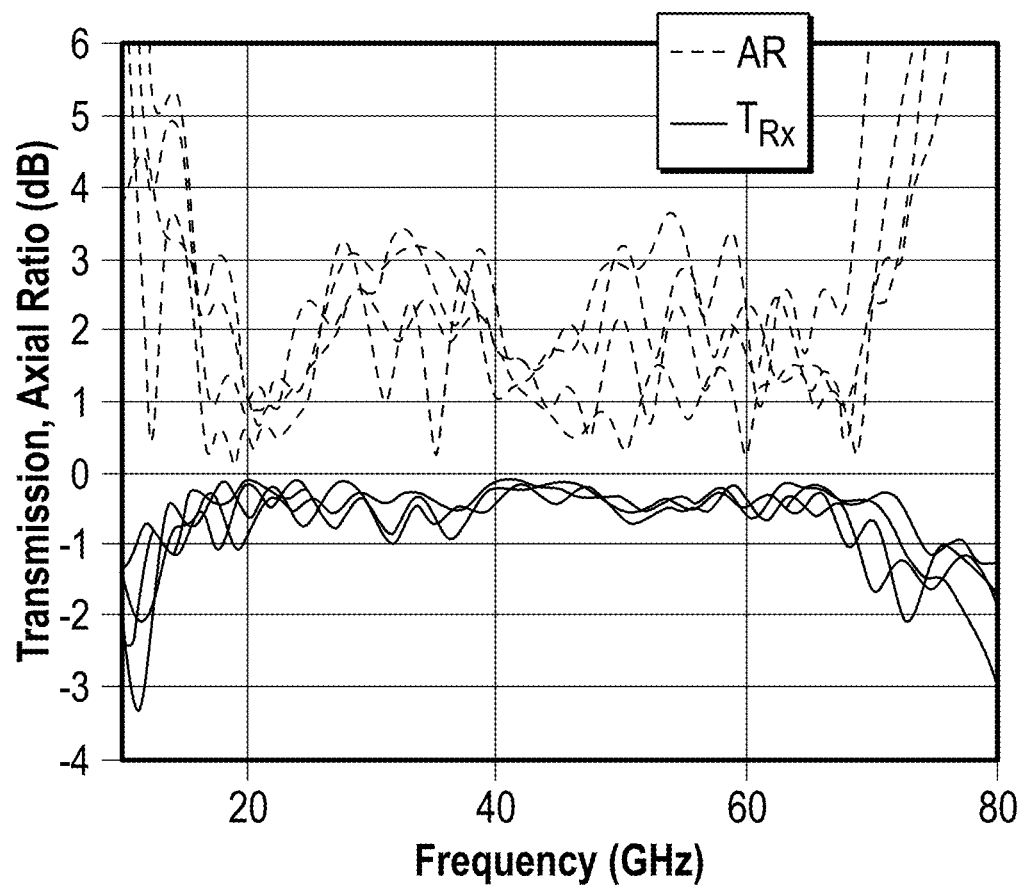

Referring now to FIGS. 4A, 4B and 4C, there is depicted the simulated transmission coefficient and axial ratio when illuminated with an x-polarized plane wave for different angles of incidence. At normal incidence, the transmission coefficient ($T_{Rx}$) is above −1 dB between approximately 11 GHz and 72 GHz, and the axial ratio (AR) is below 3 dB from approximately 15 GHz to 70 GHz (4.7:1 bandwidth). This polarizer also performs well at oblique incidence as shown in FIGS. 4B and 4C.

In accordance with an embodiment of the invention, an ultra-wideband linear-to-circular polarizer 100 is realized by modifying the conventional geometry of a meanderline polarizer. As described above, by rotating the principal axes of the various layers it is possible to increase the operable degrees-of-freedom, which can be leveraged to enhance bandwidth. Therefore, the orientation of each sheet is a free variable that is optimized. Furthermore, each sheet is not restricted to only meanderline geometries, which provides additional degrees of freedom. In other words, the layers are best represented as general, anisotropic sheet impedances.

A section of an exemplary cascaded sheet impedance polarizer is depicted in FIGS. 5A, 5B, 5C and 5D. Algorithm optimization may be utilized to design the polarizer. The polarizer includes impedance matching layers $104_1$, $104_2$ on the outside, and cascaded anisotropic metallic patterns printed on Rogers 4003 substrates (sheets $102_1$, $102_2$, ... $102_8$) disposed between impedance matching layers $104_1$, $104_2$ and rotated relative to the z-axis as described above. In an example, the permittivity of the 4003 substrate (ε=3.55) is large enough to improve the performance at wide scan angles, but not too large to enable a broadband impedance-match to free space. In total, 8 patterned copper sheets are used, which are spaced approximately 0.4 mm apart in the z-direction. This results in roughly 25 unknowns that need to be optimized: thickness and permittivity of the 3 matching layers (6 unknowns), and dimensions (roughly 11 unknowns) and orientation (8 unknowns) of the patterned metallic sheets. Again, the cost function described above is utilized to minimize insertion loss and axial ratio over the operational bandwidth at normal and oblique angles of incidence.

Figure 5A:
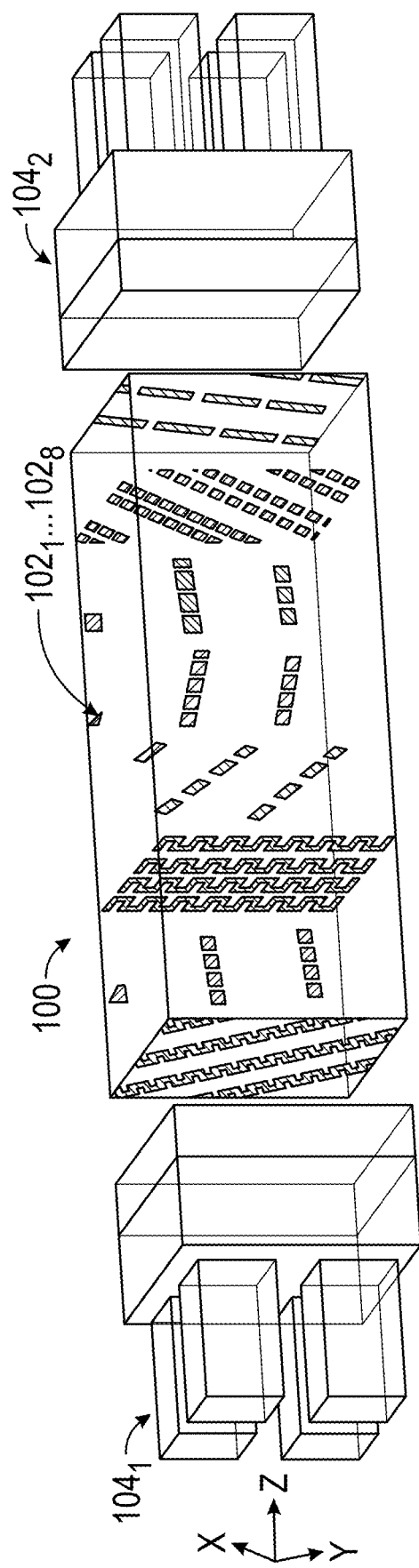
FIGS. 5A, 5B, 5C and 5D are illustrations of a section of an exemplary cascaded sheet impedance polarizer in accordance with an embodiment of the invention.
Figure 5B:
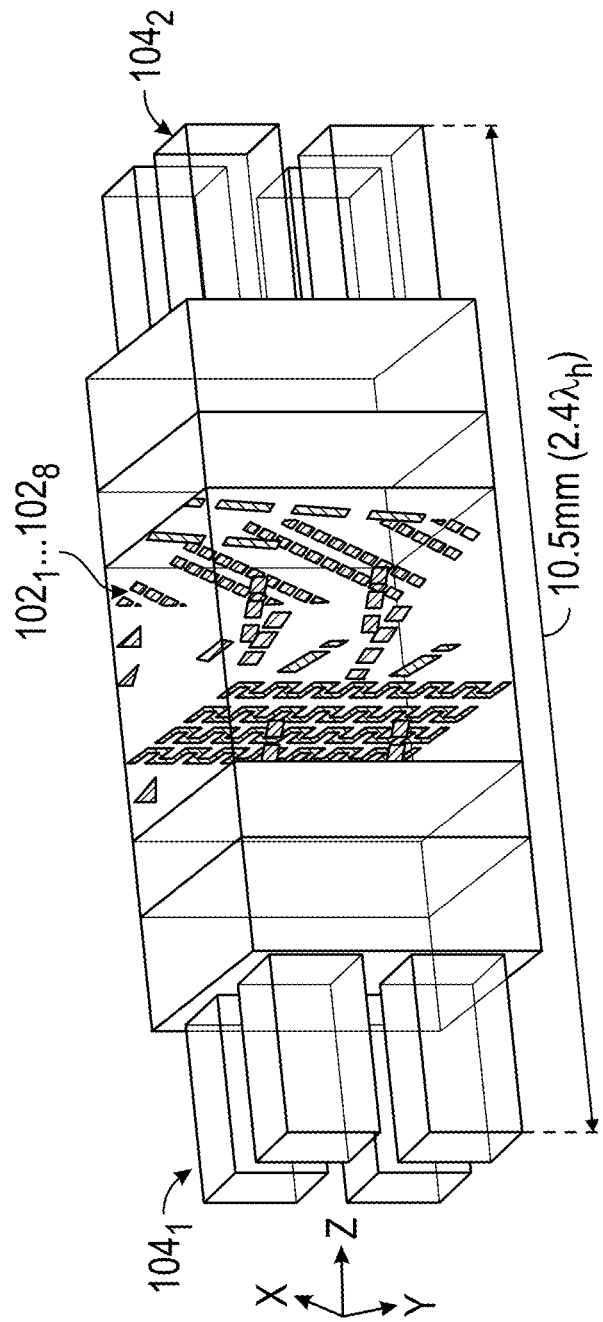
Figure 5C:
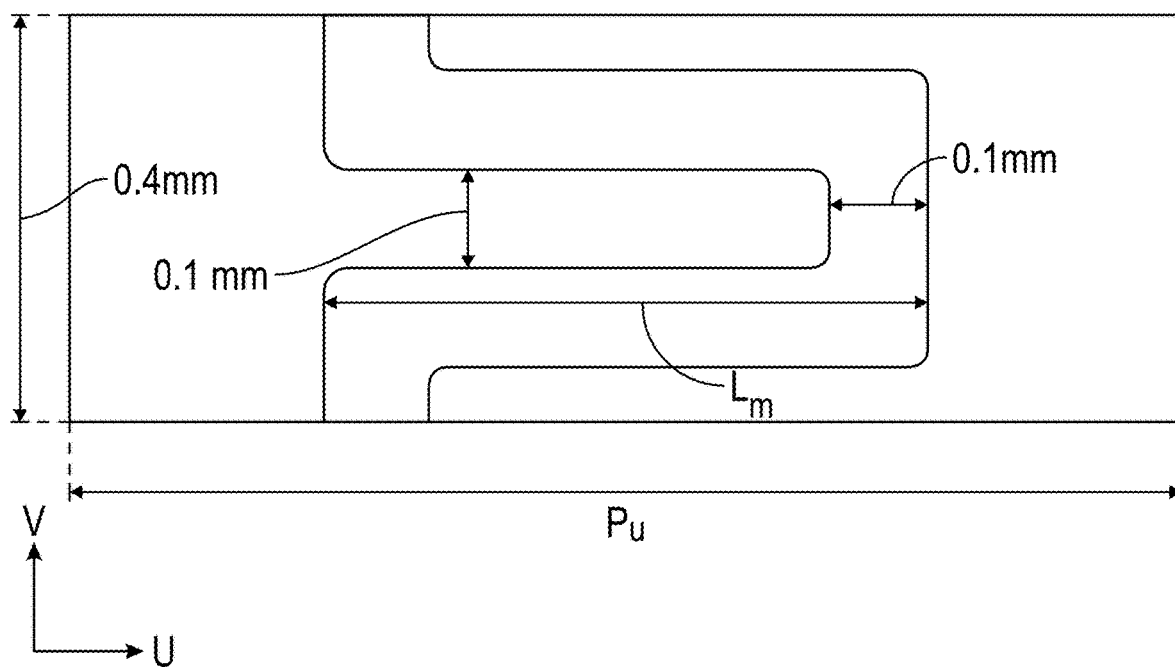
Figure 5D:
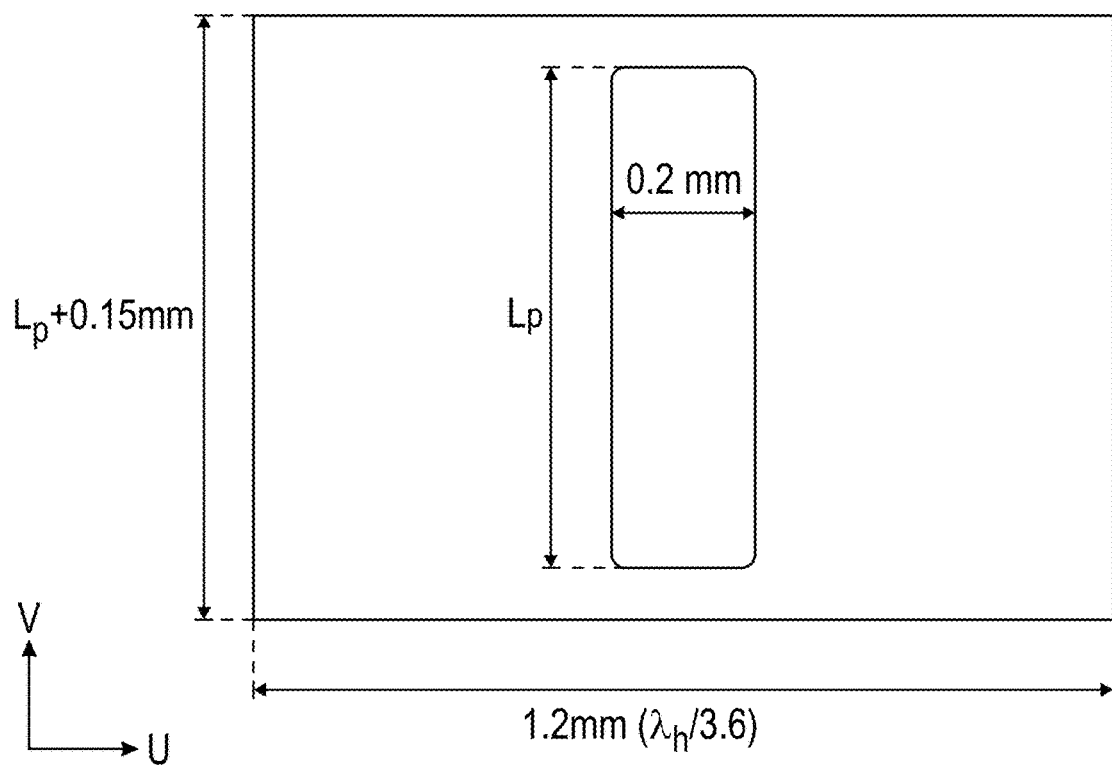

Two different metallic geometries are considered for each sheet: meanderline and metallic patches, as shown FIGS. 5C and 5D. In this implementation, parametric sweeps were performed using ANSYS HFSS® to extract the anisotropic sheet impedances of the patterned metallic geometries as a function of their dimensions ($L_m$, $P_u$, and $L_p$) and frequency, at normal incidence. Simulations demonstrated that the sheet impedance is not a strong function of the angle of incidence. Interpolation may be utilized to approximate the sheet impedance of geometries that are not explicitly simulated. The dimension $L_m$ primarily controls the inductance of the meanderline in the v-direction, while $P_u$ determines the capacitance in the u-direction. The dimension $L_p$ primarily affects the capacitance of the patch along the v-direction. Again, the u and v directions correspond to the principal axes of each sheet, which are rotated by an angle β relative to the global xy coordinate system. The simulated sheet impedances are inserted into a MATLAB® routine that analytically calculates the S-parameters of the cascaded structure and the dimensions and orientation of each sheet may optimized.

A brute force sweep may be used to determine which sheets utilize meanderline geometries and which sheets utilize patches. First, every sheet is forced to be of the metallic patch geometry, and the algorithm finds the minimum cost for this case by optimizing $L_p$, and β of each sheet, as well as the permittivity and thickness of the impedance matching layers. Then, the first sheet is replaced with the meanderline geometry and again the minimum cost is calculated using the genetic algorithm. This process is repeated until every possible combination of meanderline and patch geometry is considered, of which there are a total of $2^8=256$ combinations. At the end, the meanderline/patch combination with the lowest calculated cost is chosen. The optimal combination utilizes meanderline geometries on the first, third, and seventh sheets. However, other options may be utilized to provide similar performance, with this implementation being merely exemplary.

The optimized dimensions of each patterned metallic sheet are shown in the following table:

| Sheet# | $L_m$ (mm) | $P_u$ (mm) | $L_p$ (mm) | □ (deg.) |
|---|---|---|---|---|
| 1 | 0.28 | 0.98 | NA | 5 |
| 2 | NA | NA | 0.63 | 118 |
| 3 | 0.60 | 0.84 | NA | 46 |
| 4 | NA | NA | 0.70 | 143 |
| 5 | NA | NA | 0.55 | 126 |
| 6 | NA | NA | 0.78 | 119 |
| 7 | 0.60 | 1.10 | NA | 89 |
| 8 | NA | NA | 0.76 | 60 |

The effective permittivities of the impedance matching layers shown in FIG. 5A are approximately 1.3, 1.8, and 3.0, with thicknesses equal to approximately 1.8 mm, 1.2 mm, and 0.75 mm, respectively.

Figure 6A:
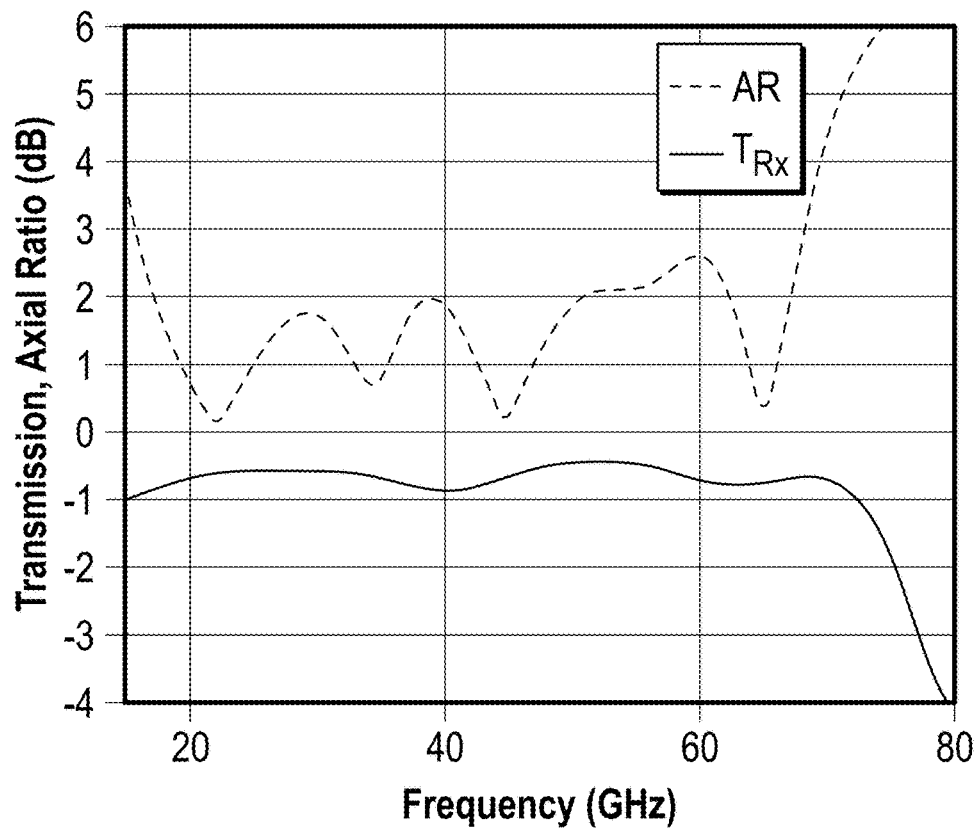
FIGS. 6A, 6B and 6C are graphical representations of simulated performance of the polarizer shown in FIGS. 5A, 5B, 5C and 5D.
Figure 6B:
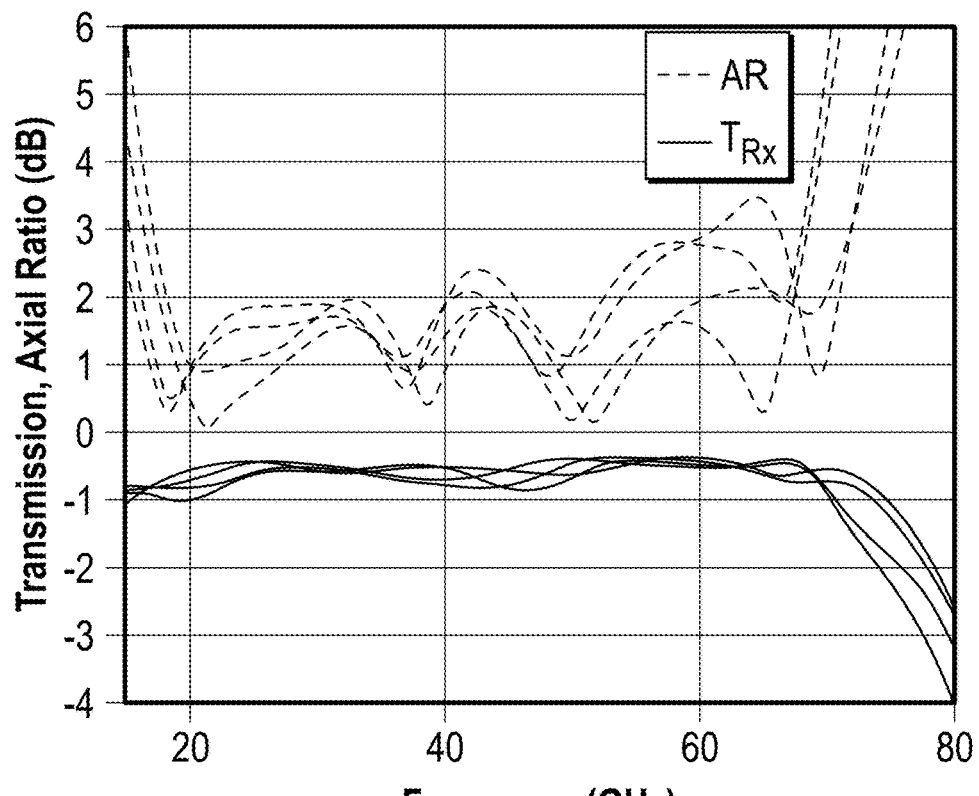
Figure 6C:
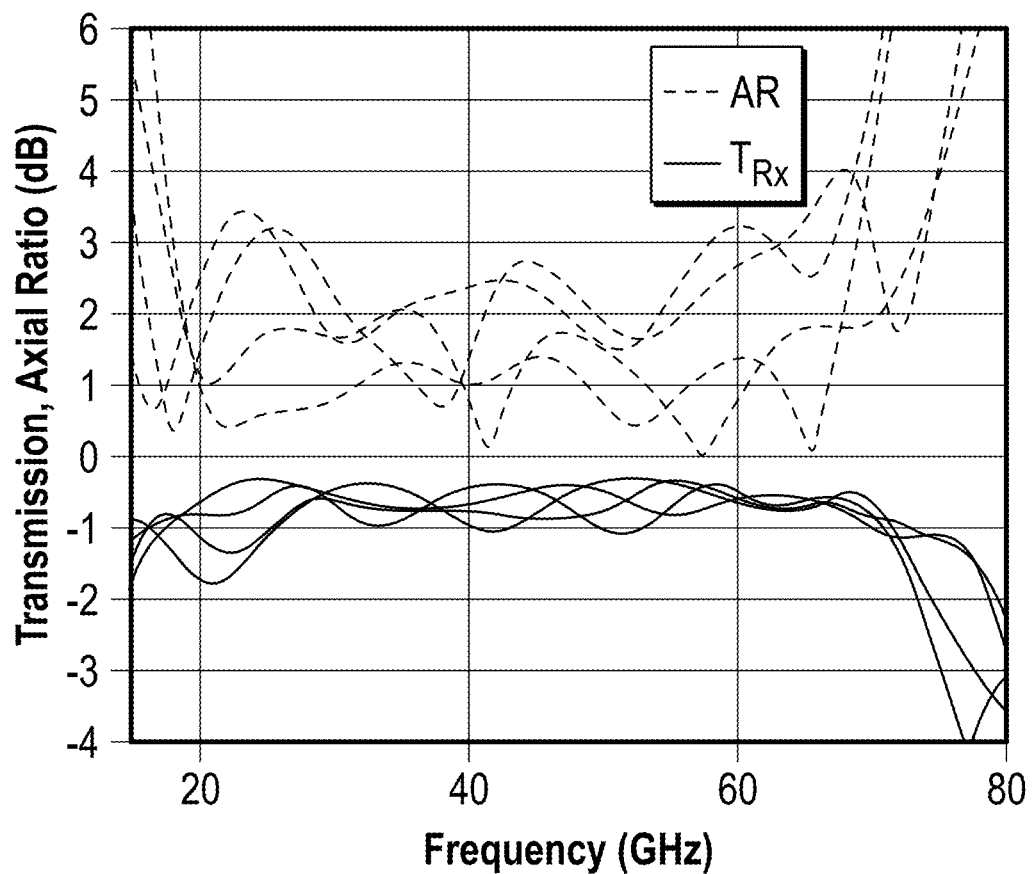

Since it may be inefficient to rigorously simulate the entire polarizer using a full-wave solver, the S-parameters of the different layers are cascaded together using the circuit solver in the HFSS® modeling tool to calculate the S-parameters of the overall structure. Full wave simulations of similar geometries that are periodic verified that simply cascading S-parameters provides an accurate estimate of the overall performance. In other words, evanescent coupling between the different layers can be neglected for these cells sizes and interlayer spacing. The simulated performance is shown graphically in FIGS. 6A, 6B and 6C.

At normal incidence, the transmission coefficient ($T_{Rx}$) is above approximately −1 dB between approximately 15 GHz and 72 GHz, and the axial ratio is below approximately 3 dB from approximately 16 GHz to 68 GHz (4.2:1 bandwidth). When illuminated at 60° from normal incidence in the E, H, and diagonal planes, the peak axial ratio increases to approximately 4 dB within the operating band. In this regard, the polarizer performs well at oblique angles of incidence.

Linear-to-circular polarizers in accordance with embodiments of the invention may be fabricated and measured using a Gaussian beam telescope. In an exemplary embodiment, this system generates an incident Gaussian beam with beam waist diameter roughly equal to 3λ, which significantly reduces the required fabricated area compared to the case where a single lens or no lenses are used. The system operates between approximately 15 GHz and 110 GHz. The Gaussian beam telescope consists of 2 linearly polarized standard gain horn antennas on either side of the polarizer under test. The horns have a high gain (~23 dB), and their radiated beams are quasi-Gaussian (85% coupling to the fundamental Gaussian mode). In order to characterize the polarizers across the wide operating bandwidth, four different standard gain horn antennas were used to cover the K, Ka, V, and W bands. The horns are connected to a 2-port network analyzer that is integrated with frequency extenders to allow for measurements of the S-parameters up to 110 GHz. The system utilizes 4 plano-convex Teflon® lenses with approximately 100 mm diameters and approximately 150 mm focal lengths. The lenses are separated from each other by the sum of their focal lengths (300 mm), which generates a collimated quasi-Gaussian beam at the center of the system with unity magnification at all operating frequencies. The polarizers are mounted on a 3D printed rotation stage that allows for measuring the transmission coefficients at normal incidence and oblique incidence, along different planes (e.g., E, H, and diagonal planes). The beam waist diameter at the lower operating frequencies (approximately 15 GHz) is calculated to be ~50 mm, and it reduces as the frequency increases. Therefore, the cross-sectional diameter of the polarizer in this example needs to be approximately at least 50 mm. Orienting the polarizer for measurements at oblique angles reduces the effective cross-sectional area seen by the incident Gaussian beam. For example, a 60° scan angle effectively reduces the polarizer's area by approximately one-half.

Linearly polarized horn antennas may be used to measure the polarizers. However, when characterizing the linear-to-circular transmission matrix it is helpful to have knowledge of the transmitted field along two independent polarizations. Conceptually, the simplest method of characterizing the transmitted field is to first orient the receive horn to receive x-polarization, and then rotate the horn by 90° to receive y-polarization. Once $T_{xx}$ and $T_{yx}$ are known, it is straightforward to calculate $T_{Rx}$, $T_{Lx}$, or equivalently, the transmitted axial ratio. This approach may be less than desirable since the phase center of the receive horn can easily shift when physically rotated. Thus, it is advantageous to first orient the two horns to measure $T_{xx}$. To measure an additional component of the transmitted polarization, a wire-grid polarizer oriented along the x+y direction is inserted into the path of the Gaussian beam, after the polarizer under test. The transmission coefficients of the wire-grid polarizer along its two principal axes are independently measured so that its presence can be properly calibrated. By utilizing measurements with and without the wire-grid polarizer in the beam's path, it is possible to extract the transmitted field along two independent polarizations. These measurements are used to characterize $T_{Rx}$ and the transmitted axial ratio.

Figure 7A:
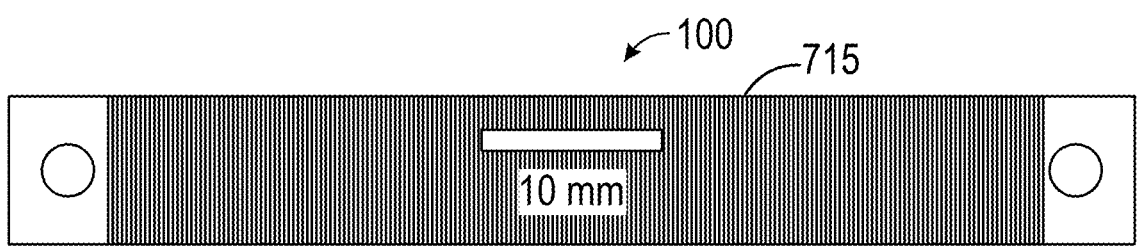
FIGS. 7A, 7B and 7C are illustrations of a cascaded waveplate polarizer fabricated by stacking together chemically etched printed-circuit-boards in accordance with an embodiment of the invention.
Figure 7B:
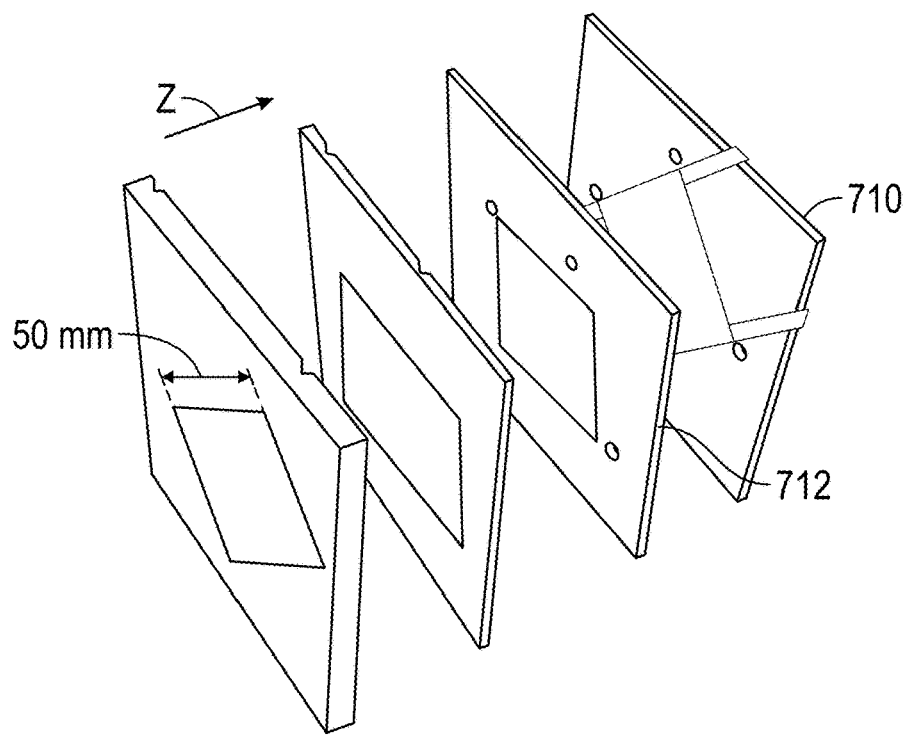
Figure 7C:
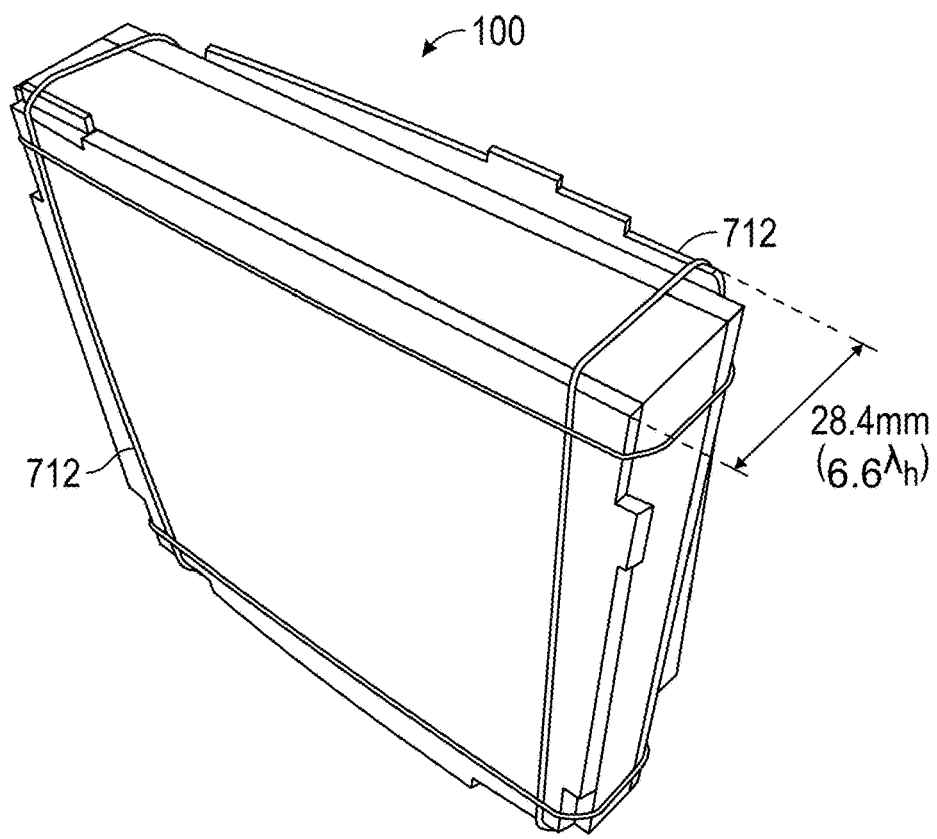

With reference to FIGS. 7A, 7B and 7C, a cascaded waveplate polarizer 100 in accordance with an embodiment of the invention may be fabricated by stacking together chemically etched printed-circuit-boards (PCBs) 710. One of the fabricated PCBs 712 for the first waveplate $102_1$ is depicted in FIG. 7A. This PCB is stacked together with 83 identical PCB's in the u-direction (see the unit cell illustrated in FIG. 3) to construct waveplate $102_1$. A designed approximately 0.1 mm air gap between the stacked PCBs (in the u-direction) is realized by placing approximately 0.1 mm shims between the boards at the edges thereof. The same process is employed to construct the other waveplates $102_2$, $102_3$, $102_4$. The 4 different cascaded waveplates are depicted in FIG. 7B. In the figure, the components are spaced apart for clarity. As shown in FIG. 7C, 3D printed holders 712 support each PCB in the proper orientation.

Figure 8:
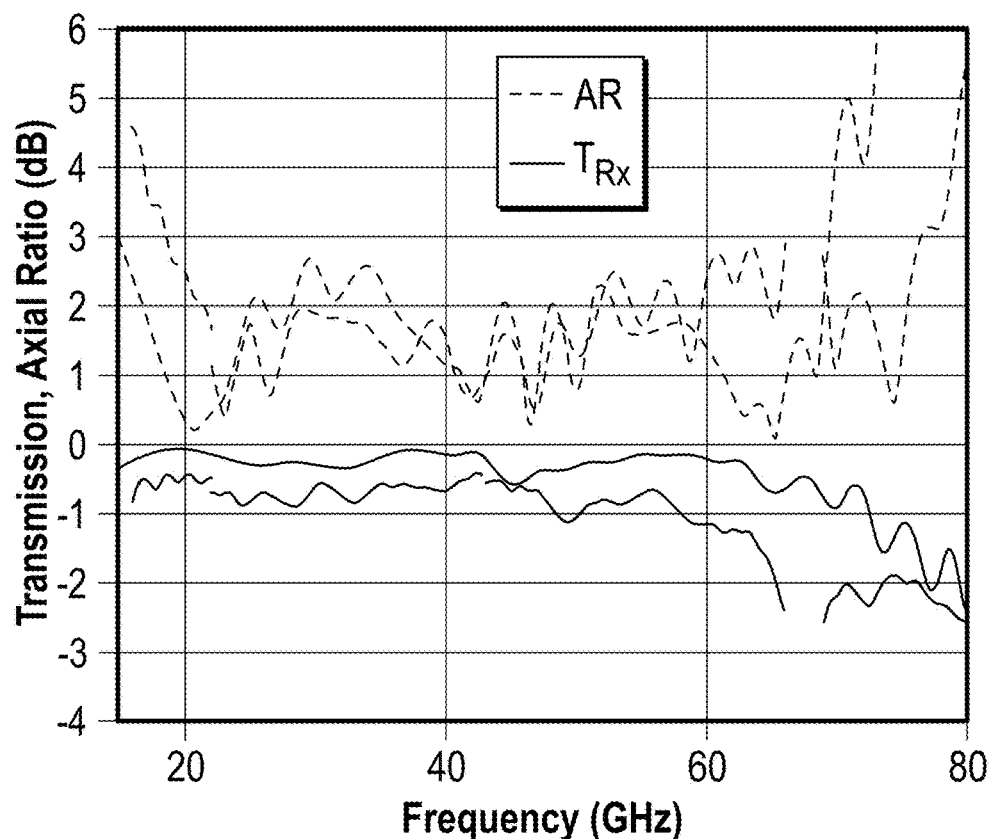
FIG. 8 is a graphical representation of the cascaded waveplate polarizer's measured and simulated transmission coefficient ($T_{Rx}$), and axial ratio (AR) at normal incidence.

With reference to FIG. 8, there is shown a graphical representation of the cascaded waveplate polarizer's measured and simulated transmission coefficient ($T_{Rx}$), and axial ratio (AR) at normal incidence. There is good agreement between measurement and simulation. The gap in measured frequencies at 67 GHz corresponds to the location where the network analyzer switches modes between using internal signal generators (below 67 GHz) and external frequency extenders (above 67 GHz). The measured axial ratio is below approximately 3 dB between approximately 19 GHz and 76 GHz (4:1 bandwidth), and the insertion loss is below 2.5 dB over this frequency range. The insertion loss of the measurements is about 0.5 dB larger than simulations, which could be due to fabrication tolerances, metal surface roughness, and/or air gaps between the 4 different waveplate sections and impedance matching layers.

Figure 9A:
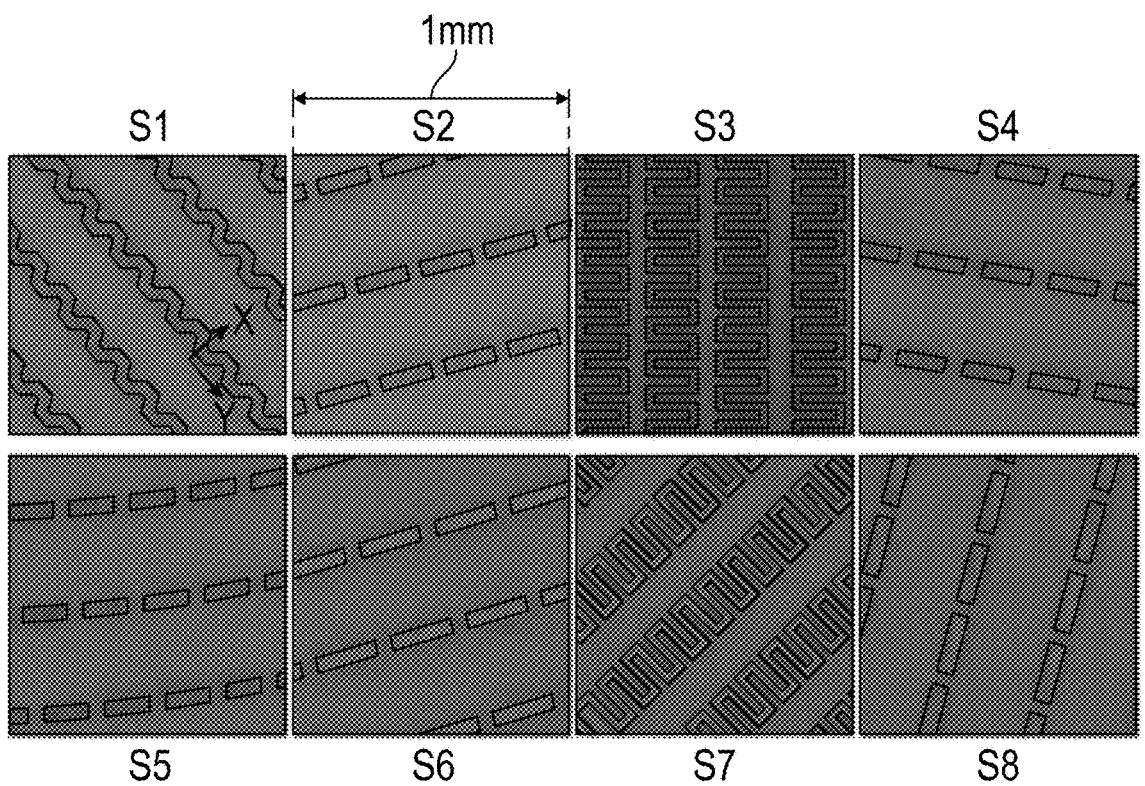
FIGS. 9A and 9B are illustrations of a cascaded sheet impedance polarizer in accordance with an embodiment of the invention fabricated using standard PCB processing techniques.
Figure 9B:
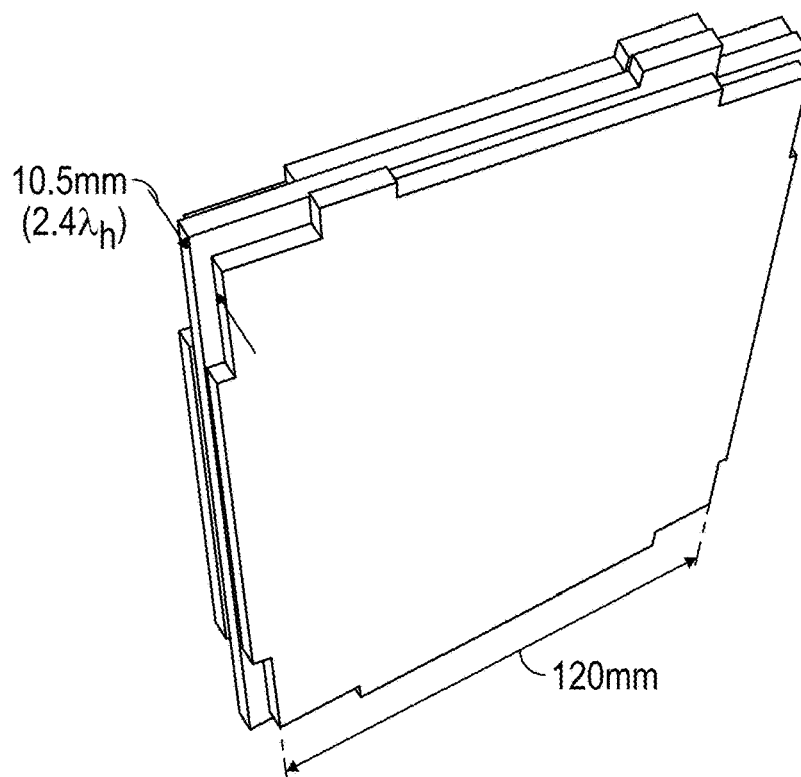

With reference now to FIGS. 9A and 9B, a cascaded sheet impedance polarizer is fabricated using standard PCB processing techniques. Each sheet is chemically etched and then bonded together. The fabricated sheets before bonding are shown in FIG. 9A, and the finished polarizer assembly after bonding and securing the impedance matching layers is depicted in FIG. 9B.

Figure 10A:
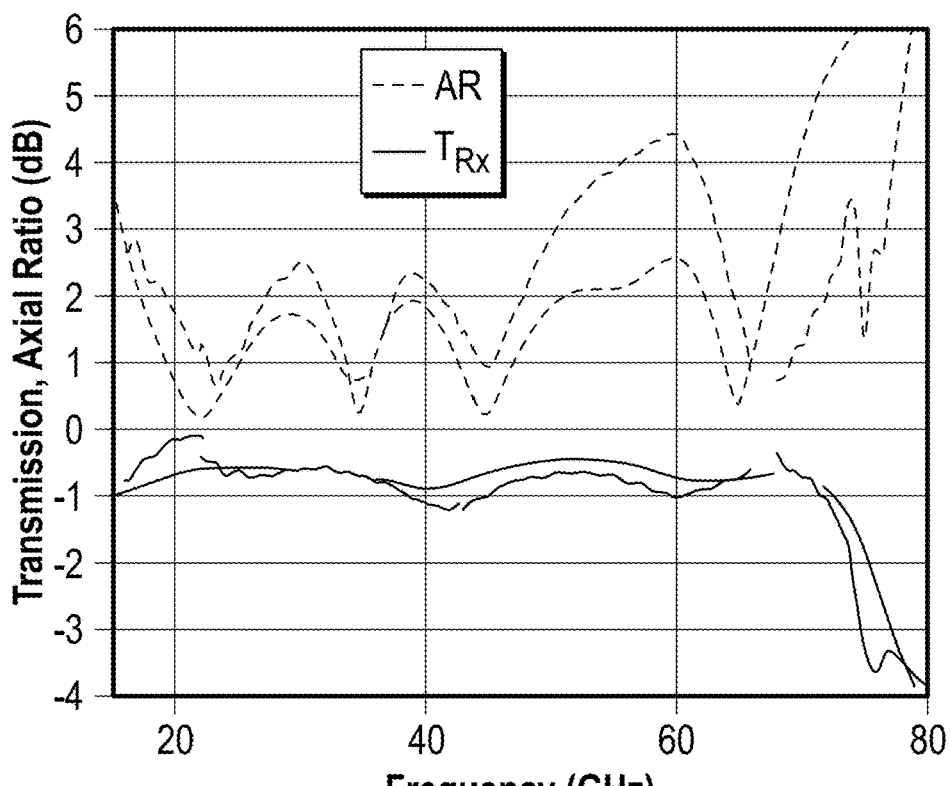
FIGS. 10A, 10B and 10C are graphs of the measured and simulated performance of the cascaded sheet impedance polarizer for various angles of incidence, where
Figure 10B:
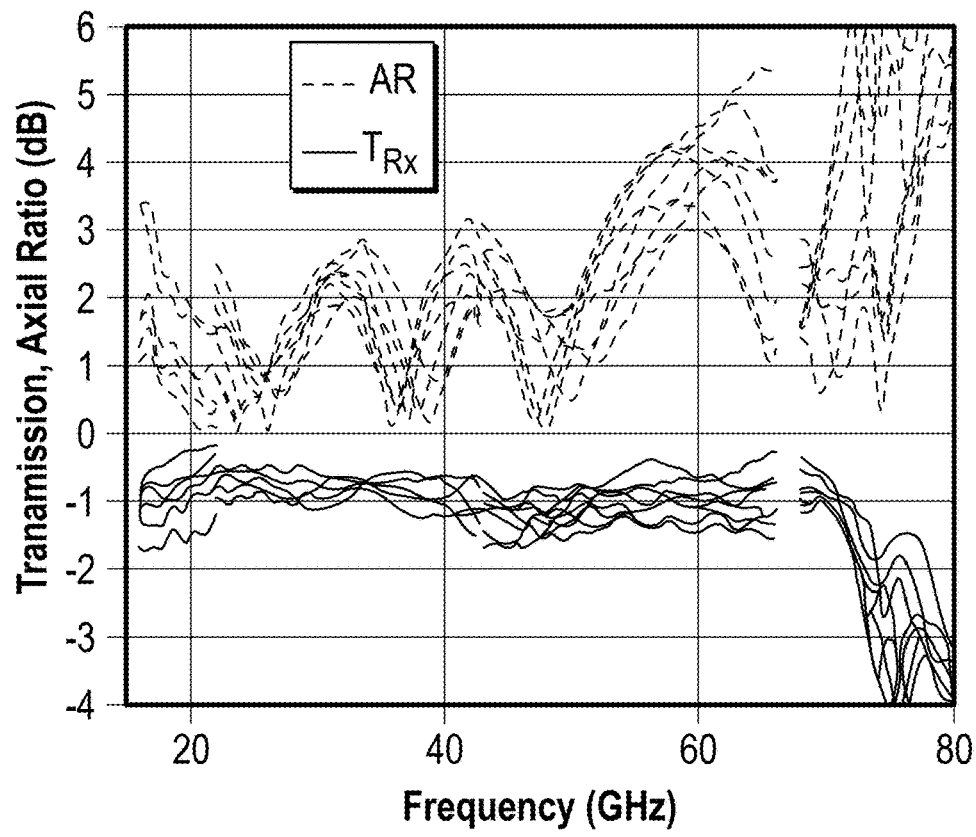
Figure 10C:
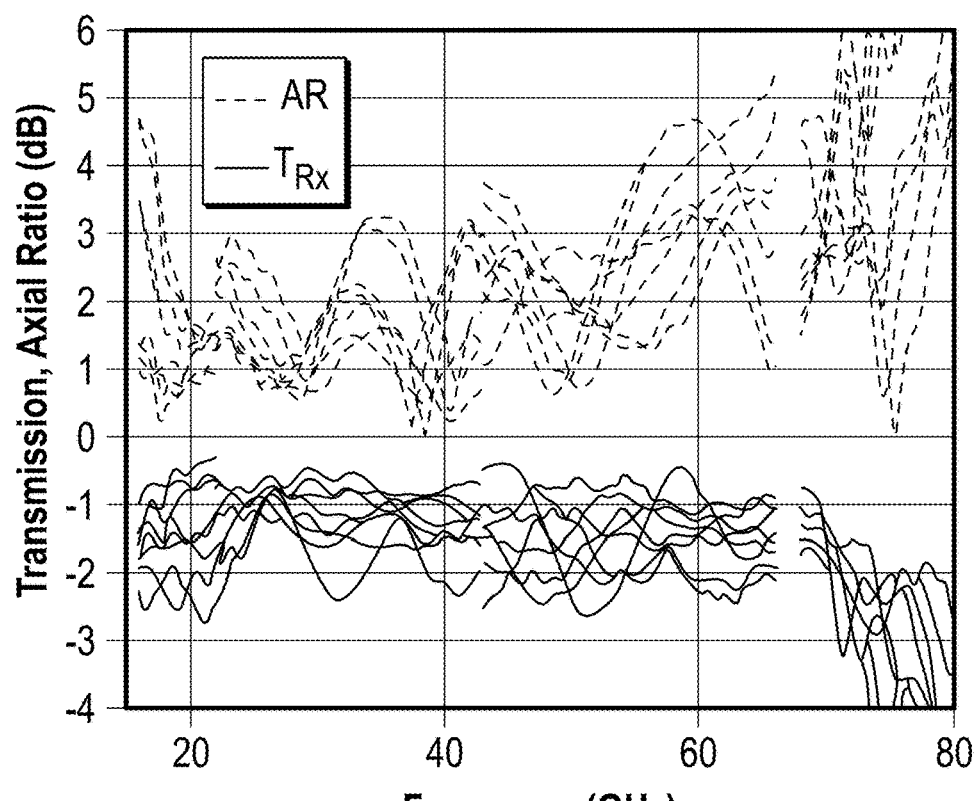

With reference to FIGS. 10A, 10B and 10C, the measured and simulated performance of the cascaded sheet impedance polarizer is depicted for various angles of incidence. FIG. 10A shows a normal incidence. The measured insertion loss is below approximately 1.5 dB between approximately 16 GHz and 73 GHz, and the axial ratio is below approximately 4.5 dB over this frequency range. There is reasonable agreement between simulation and measurement. The larger measured axial ratio at 60 GHz may be attributed to fabrication tolerances. The cascaded sheet impedance polarizer was also characterized at oblique angles of incidence ($\theta=45°, 60°$), along the E, H, and diagonal planes ($\phi=0°, 45°, 90°, 135°, 180°, 225°, 270°, 315°$ planes). The performance only slightly degrades as the angle of incidence is increased to 45° from normal, as shown in FIG. 10B. At an angle of incidence of 60° from normal, the average insertion loss and axial ratio increases by roughly 1 dB compared to the broadside case as shown in FIG. 10C.

Figure 11:
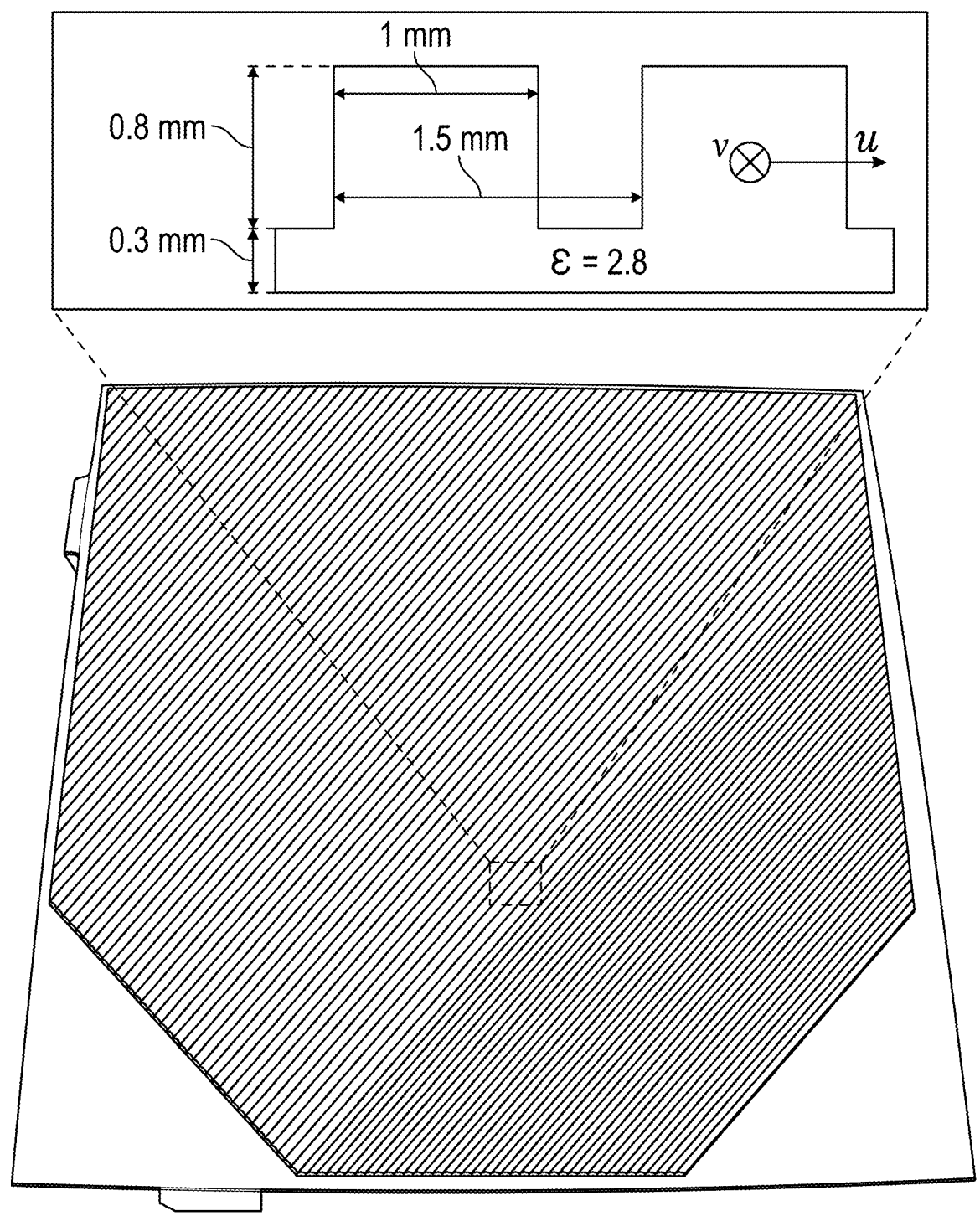
FIG. 11 depicts an embodiment of a polarizer in accordance with an embodiment of the invention having an additional anisotropic layer for improved performance.
Figure 12A:
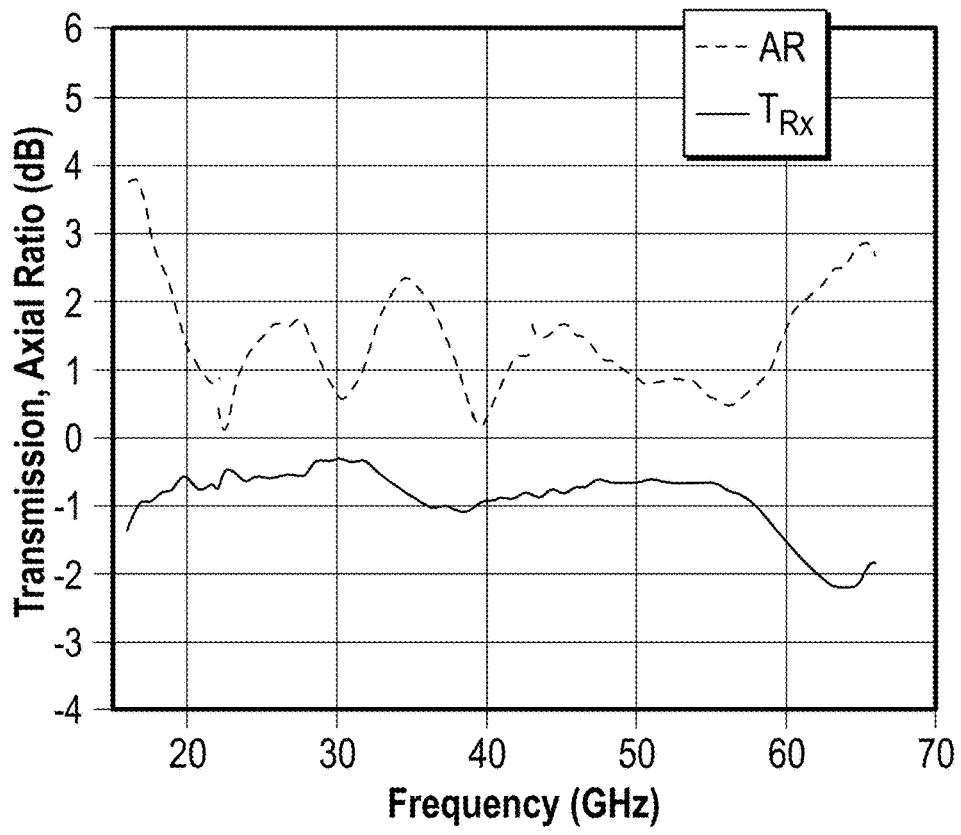
FIGS. 12A and 12B are graphs illustrating the measured performance of the polarizer of FIG. 11 at a normal angle of incidence and 60° scan angles.
Figure 12B:
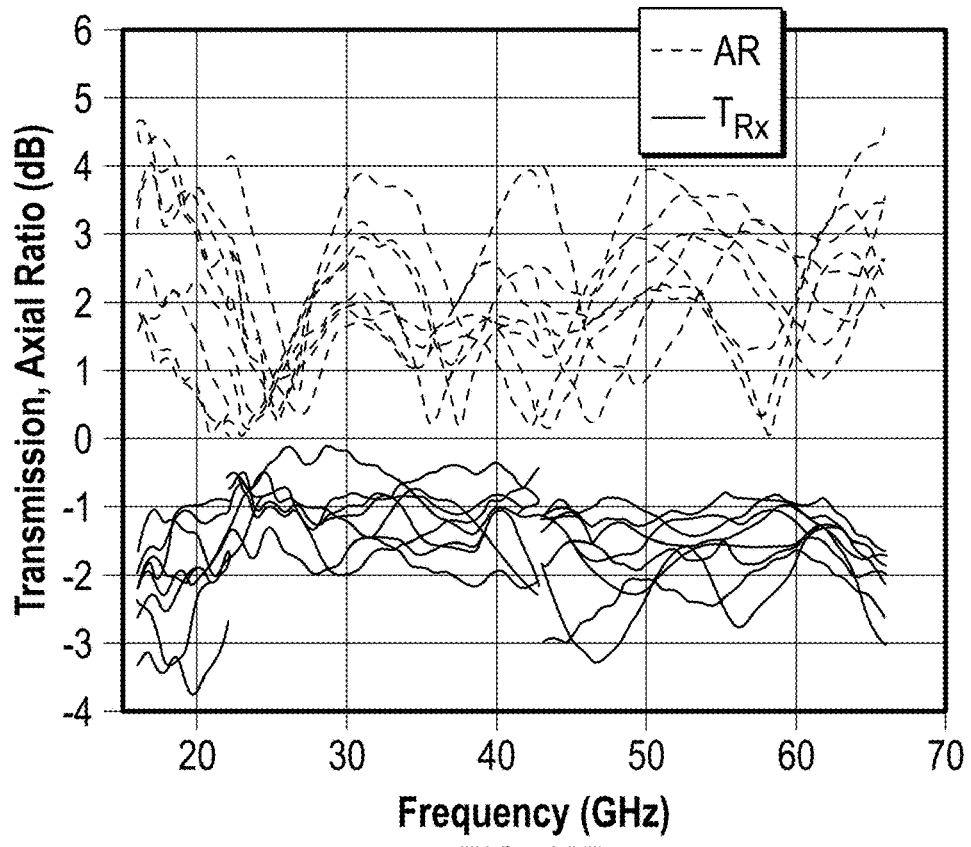

With reference now to FIG. 11, there is depicted an improved linear-to-circular polarizer in accordance with the embodiments of the invention that may be realized by adding an additional anisotropic layer to compensate for the higher axial ratio near 60 GHz. A 3D printed dielectric grating made from VeroWhite ($\epsilon=2.8$) is embedded within the impedance matching layers (sandwiched between the $\epsilon=3$ and $\epsilon=1.8$ layers). A side view of the designed grating is shown in the inset. The grating generates a simulated relative phase shift difference of approximately 7° between the u and v polarizations at 60 GHz, which in turn brings the transmitted phase shift difference between x and y polarizations closer to the ideal 90° at the higher operating frequencies. The phase shift difference between u and v polarizations is directly proportional to the frequency. Therefore, the additional grating negligibly affects the performance at the lower operating frequencies. The measured performance at normal incidence and 60° scan angles is shown in FIGS. 12A and 12B. The presence of the dielectric grating keeps the axial ratio below approximately 3 dB from approximately 17 GHz to 66 GHz at normal angles of incidence (FIG. 12A). The polarizer's performance only marginally degrades when illuminated at wide scan angles such as shown in FIG. 12B.

It will be appreciated that the devices and methods of fabrication disclosed in accordance with embodiments of the invention are set forth by way of example and not of limitation. Absent an explicit indication to the contrary, the disclosed devices, systems, and method steps may be modified, supplemented, omitted, and/or re-ordered without departing from the scope of this invention. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

It will be understood by those skilled in the art that various changes may be made in the form and details of the described embodiments resulting in equivalent embodiments that remain within the scope of the appended claims.

What is claimed is:

1. A linear-to-circular polarizer, comprising:
   a plurality of cascaded waveplates having biaxial permittivity, each cascaded waveplate having a principal axis rotated at different angles relative to an adjacent section about a z-axis of a 3-dimensional x, y, z coordinate system, each of the plurality of cascaded waveplates comprising an assembly of printed circuit boards and a unit cell of an artificial anisotropic dielectric, and
   impedance matching layers disposed adjacent the cascaded waveplates, the impedance matching layers comprising a first assembly of impedance matching layers and a second assembly of impedance matching layers, each of the first and second assemblies of impedance matching layers comprising a first section having a first permittivity $\in_1$, a second section having a second permittivity $\in_2$ greater than the first permittivity, and a third section having a third permittivity $\in_3$ greater than the second permittivity.

2. A linear-to-circular polarizer, comprising:
a plurality of cascaded anisotropic sheets, each sheet having a principal axis rotated at different angles relative to an adjacent sheet about a z-axis of a 3-dimensional x, y, z coordinate system; and
impedance matching layers disposed adjacent the cascaded sheets.

3. The linear-to-circular polarizer of claim 2, where the cascaded sheets comprise anisotropic metallic patterns.

4. The linear-to-circular polarizer of claim 3, where the anisotropic metallic patterns have meanderline and metallic patch geometries.

5. The linear-to-circular polarizer of claim 2, where the impedance matching layers comprise a first assembly of impedance matching layers and a second assembly of impedance matching layers, each of the first and second assemblies of impedance matching layers comprising a first section having a first permittivity $\in_1$, a second section having a second permittivity $\in_2$ greater than the first permittivity, and a third section having a third permittivity $\in_3$ greater than the second permittivity.

6. The linear-to-circular polarizer of claim 5, where each assembly of impedance matching layers comprises a plurality of different substrates.

7. A linear-to-circular polarizer, comprising:
a plurality of cascaded anisotropic sheets, each sheet having a principal axis rotated at different angles relative to an adjacent sheet about a z-axis of a 3-dimensional x, y, z coordinate system, the cascaded sheets comprising anisotropic metallic patterns having meanderline and metallic patch geometries; and impedance matching layers disposed adjacent the cascaded sheets, the impedance matching layers comprising a first assembly of impedance matching layers and a second assembly of impedance matching layers, each of the first and second assemblies of impedance matching layers comprising a first section having a first permittivity $\in_1$, a second section having a second permittivity $\in_2$ greater than the first permittivity, and a third section having a third permittivity $\in_3$ greater than the second permittivity.

8. The linear-to-circular polarizer of claim 7, further comprising a three dimensional (3D) printed dielectric grating embedded between the impedance matching layers.

* * * * *